United States Patent Office 3,713,990
Patented Jan. 30, 1973

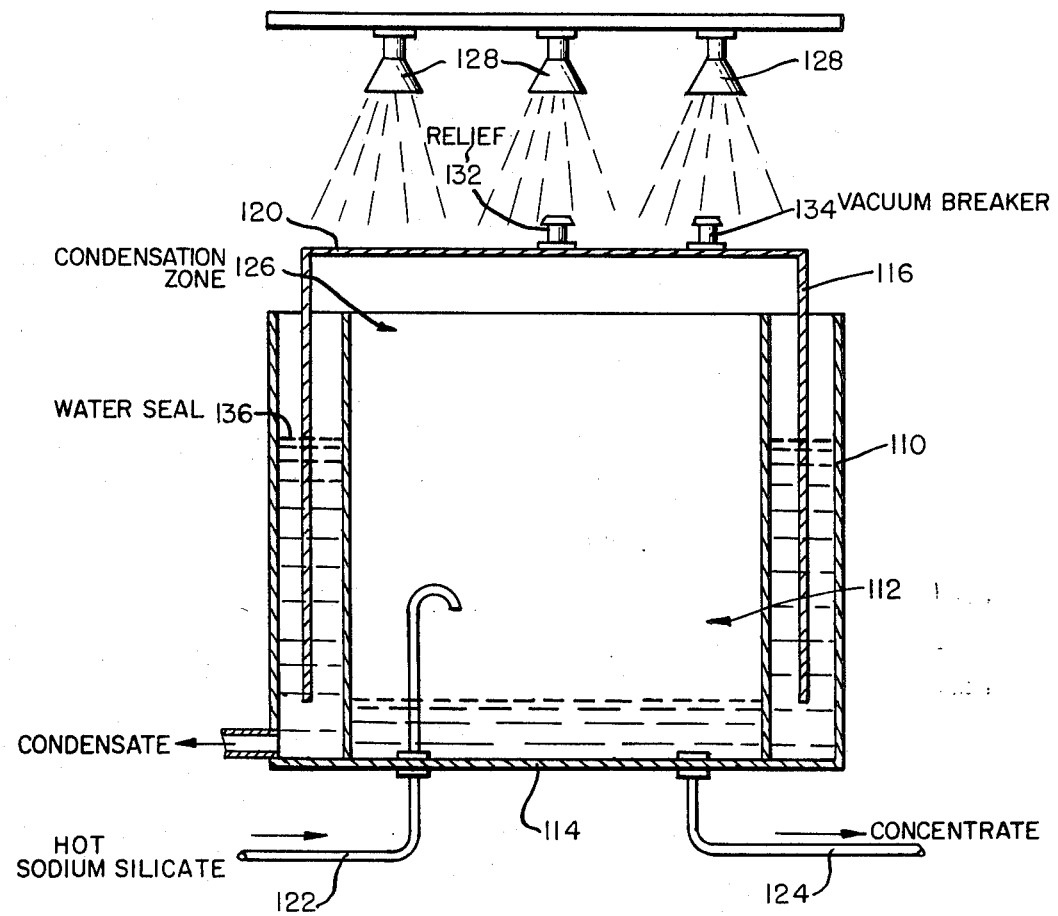

3,713,990
APPARATUS FOR LIQUID SEPARATION BY
FLASH DISTILLATION
Frank J. Lazet, Media, Pa., assignor to Philadelphia
Quartz Company, Philadelphia, Pa.
Filed Jan. 29, 1971, Ser. No. 110,886
Int. Cl. B01d *3/00;* F28b
U.S. Cl. 202—185                                  2 Claims

ABSTRACT OF THE DISCLOSURE

This invention relates to an apparatus for effecting the separation of a more readily vaporizable component, such as water, from a multi-component fluid stream by providing a flash vaporization section and a means for condensing the vapors released during the vaporization without contaminating the atmosphere, and thus avoiding a possible air pollution problem.

BACKGROUND

Figure 1:
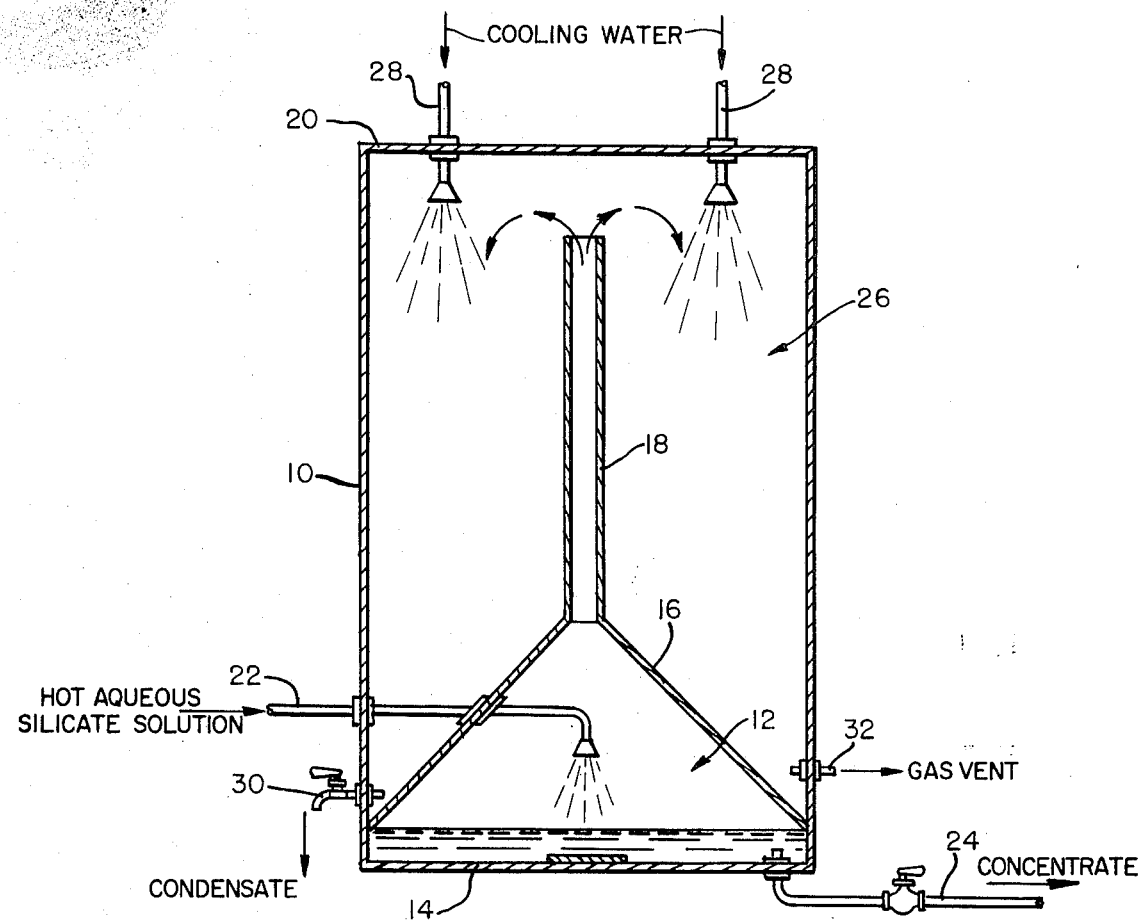

There are many processes which involve the handling or disposition of a fluid stream containing a component that is rather readily vaporizable. More specifically there are many instances where process streams contain water that must either be reduced in quantity or entirely removed. This removal is frequently effected by simply introducing a hot stream of liquid into a tank and allowing the readily vaporizable material to vaporize and exit through a conduit or stack into the atmosphere. In other cases, quite complex separation systems have been developed. Of course, with the present emphasis on minimizing pollution of the atmosphere, any plant that allows noticeable quantities of visible vapor to rise above a commercial installation is running a considerable risk that it will be criticized by both governmental authorities and vigilant members of the surrounding community. Accordingly, it is quite desirable to minimize the expulsion of visible streams of gas or vapor into the atmosphere wherever possible.

It is therefore an object of this invention to provide an apparatus which will minimize or eliminate the expulsion of vapors into the atmosphere by condensing at least a portion of the components that are released during flash vaporization processes.

Fundamentally, this invention involves the use of an expansion chamber connected with another chamber into which is passed a hot stream of a liquid composition, part of which is readily vaporizable, permitting the vaporization of this portion into the expansion chamber removing the residual liquid, condensing the vapor and thereafter removing it.

Referring now to FIG. 1 of the drawing, there is shown a cross-sectional view of a tank 10 or similar chamber. The lower portion of the tank 10 consists of a flash vaporization section 12 which is defined by the bottom 14 of the tank and an inverted conical or equivalent continuous baffle member 16 located at a spaced distance above the bottom of the tank. The upper end of the inverted conical baffle member 16 opens into an elongated passageway 18 that extends upwardly to a point adjacent the top 20 of the tank 10.

A conduit 22 extends from the exterior of the tank 10 into said flash vaporization section 12 so that a hot multi-component fluid stream can be introduced into the flash vaporization section.

An outlet conduit 24 extends from the lower portion of the flash vaporization section 12 to the exterior of the tank 10 and permits the removal of unvaporized material.

A condensation zone 26 is located within the tank 10 at a position above the flash vaporization zone 12 and exterior to said passageway 18. Spray means 28 are positioned adjacent the top 20 of said tank for the introduction of a cooling fluid so that the cooling fluid will drop downwardly through the condensation zone and, after intermingling with the vaporized gases exiting from passageway 18, will cause the condensation of at least a portion of the vaporized gases exiting from the top of passageway 18.

Near the lower portion of the condensation zone 26 there is provided a liquid drain means 30 for withdrawal of the liquid which is condensed within the condensation zone 26.

The apparatus is also provided with at least one gas vent means 32 in the tank 10 so that uncondensed gases can be withdrawn. The size of the opening in these gas vent means 32 can be manually set or can be periodically or continuously varied by thermostats or pressure responsive devices.

One example of a process involving specific chemicals that could be utilized in connection with the described apparatus is believed worth mentioning. In the silicate industry, high pressure dissolvers are used to form an aqueous solution of sodium silicate. However, such aqueous solutions contain more water than is desired and it is therefore necessary to reduce the amount of water. With the instant apparatus a hot fluid stream of aqueous silicate solution can be introduced through conduit 22 into flash vaporization zone 12. If such a stream under pressure of 14.7 p.s.i.g. and at a temperature of 100° C. is introduced into flash vaporization zone 12, a flashed vapor (steam) will immediately rise through the passageway 18. As the steam exits from the passageway 18 it will come in contact with the water sprays introduced through spray means 28 at a temperature of approximately 25° C. The vapor will be condensed and the condensed water will fall downwardly and be removed through the condensate drain 30.

It will be appreciated that by virtue of the condensation caused by the water spray a vacuum will develop in the condensation zone 26 which will assist in drawing the steam up the passageway 18 from the flash vaporization zone 12.

The use of one or more air vents 32 around the periphery of the tank will permit control of the amount of vacuum that does exist in the condensation zone. Of course, the greater the vacuum the more steam that will be pulled out of the hot liquid introduced into the flash vaporization zone.

The condensed steam or condensate can be used directly as make up water for the silicate in the dissolver operation. This water will be purer than ordinary city water in most cases.

Obvious alternative cooling means, such as placing the water sprays outside the tank 10, may be employed.

FIG. 2 shows an alternative embodiment that I have devised, and it will be noted that in FIG. 2 there is shown a cross-sectional view of a tank 110, the lower portion of which comprises a flash vaporization section 112 defined by the bottom of the tank 114 and an inverted movable baffle 116 which is separated from the atmosphere by a water seal 136. This inverted baffle 116 will rise as the vaporization increases pressure within the tank and in so doing it establishes a variable volume condensation zone 126 with a relief valve 132 and a vacuum breaker 134 suitably placed in the baffle 116 in order to control the pressure within the system. If the baffle is conical, the condensed liquid will run into the seal 136 and may be removed as needed.

In operation the hot liquid is forced through the inlet 122 which may be a blow-down line from a silica dissolver into the vaporization zone 112 and the vaporized liquid expands into the vaporization zone 126. The residual liquid is drawn off by the outlet 124. Subsequently the water sprays 128 cool the top 120 of the baffle 116 and the vapor is condensed in zone 126 and falls to the bottom and is then drawn off through outlet 124. Alternately the sprays may be inside the zone 126 and attached to the top of the movable baffle and may condense the vapor by direct contact. The cooling water may be acidified to neutralize the condensed vapor if it is not returned to the process.

As a specific example, hot sodium silicate from a dissolver may pass from the blow-down pipe into tank 112 which is 20 ft. in diameter and 20 ft. high and comprises a vaporizing zone 112. The liquid silicate has a temperature of approximately 100° C. and is blown down at about 14.7 lbs. in.² The pressure inside the tank will rise to about 0.3 p.s.i.g. The baffle 116 will therefore rise, increasing the expansion zone to its full height of 20 ft. or a total of 40 ft. from the bottom of the tank 110. The residual sodium silicate at full concentration is drawn off through 124 and then the vapor is condensed in zone 126 by use of the water sprays 128 and the condensed liquid is then separately drawn off.

The condensed steam or condensate can be used directly as make up water for the silicate in the dissolver operation. This water will be purer than ordinary city water in most cases.

With this system there is no great visible stream or plume of steam that must be exhausted into the atmosphere. Such a plume could not only contain polluting particles from the sodium siilcate but it would of course also cause concern to the surrounding community members.

The provision of gas vents is desirable in controlling the vacuum since if too great a vacuum develops it will cause a stress on the tank. In other words, the provision of gas vents allows a less expensive and less strong tank to be used.

Rings or other systems for increasing the surface may be used around the chimney or conical surface to increase the condensing capacity.

Also, it would be desirable to have enough silicate in the steam carried out the stack to prevent corrosion of iron surfaces.

What is claimed is:

1. An apparatus for effecting the separation of a component from a multi-component fluid stream which comprises:
   (a) an enclosed tank which consists of a bottom and a pair of relatively closely spaced, concentric side walls, and the top of the tank comprises an inverted, cup-shaped, telescoping and axially movable container whose lip is immersed in a vertically extending annular liquid seal between the sidewall, thus isolating the inside of the tank from the atmosphere, said container having a noncondensible gas vent,
   (b) condensation means comprising cooling sprays delivered to the outside of the container and the annular liquid seal capturing the condensate from the inner walls at the container, said container providing an extensible condensing chamber and zone,
   (c) a flash vaporization section located in the lower portion of said tank defined by the bottom of the tank and said container, said section lying subjacent to said condensing zone;
   (d) an inlet conduit extending from the exterior of said tank into said flash vaporization section for the introduction of said multicomponent fluid stream;
   (e) an outlet conduit extending from the lower portion of said flash vaporizatoin section to the exterior of the tank for the removal of unvaporized material;
   (f) means for withdrawing the condensed liquid;
   (g) means for controlling the pressure within said condensation zone.

2. An apparatus for effecting the separation of a component from a multicomponent fluid stream which comprises:
   (a) an enclosed tank;
   (b) a flash vaporization section located in the lower portion of said tank and which is defined by the bottom of the tank and an inverted conical baffle positioned above the bottom of the tank;
   (c) a passageway extending between the upper end of said flash vaporization section and a point adjacent the top of said tank;
   (d) an inlet conduit extending from the exterior of said tank into said flash vaporization section for the introduction of said multicomponent fluid stream;
   (e) an outlet conduit extending from the lower portion of said flash vaporization section to the exterior of the tank for the removal of unvaporized material;
   (f) a condensation zone within said tank located above said inverted conical baffle and exterior to said passageway;
   (g) spray means positioned adjacent the top of said tank for the introduction of a cooling fluid into contact with the vapors entering said condensation zone;
   (h) liquid drain means located in said condensation zone for withdrawing liquid condensed therein; and
   (i) at least one gas vent in the portion of the tank that defines an exterior wall of said condensation zone.

References Cited

UNITED STATES PATENTS

| | | | |
|---|---|---|---|
| 795,650 | 7/1905 | Rogers | 159—22 |
| 1,756,673 | 4/1930 | Baumann | 159—22 X |
| 1,883,379 | 10/1932 | Kermer | 159—22 X |
| 2,093,895 | 9/1937 | Majonnier et al. | 159—31 |
| 3,249,517 | 5/1966 | Lockman | 202—185 A |
| 2,103,521 | 12/1937 | Luly | 159—3 X |

FOREIGN PATENTS

| | | |
|---|---|---|
| 23,600 | 10/1917 | Denmark. |
| 640,714 | 7/1950 | Great Britain. |

NORMAN YUDKOFF, Primary Examiner

J. SOFER, Assistant Examiner

U.S. Cl. X.R.

202—187, 189, 190